United States Patent [19]

Arnold

[11] Patent Number: 4,813,217
[45] Date of Patent: * Mar. 21, 1989

[54] FRONT ATTACHMENT OF FIELD CHOPPING MACHINE FOR PICKING AND TRANSPORTING STALK FRUITS STANDING IN ROWS

[75] Inventor: Rudolf Arnold, Saulgau, Fed. Rep. of Germany

[73] Assignee: Claas Saulgau GmbH, Saulgau, Fed. Rep. of Germany

[*] Notice: The portion of the term of this patent subsequent to Jan. 6, 2004 has been disclaimed.

[21] Appl. No.: 79,581

[22] Filed: Jul. 29, 1987

Related U.S. Application Data

[63] Continuation of Ser. No. 865,747, May 20, 1986, Pat. No. 4,739,608, which is a continuation of Ser. No. 530,074, Sep. 7, 1983, Pat. No. 4,633,657.

[30] Foreign Application Priority Data

Sep. 7, 1982 [DE] Fed. Rep. of Germany ....... 3233122

[51] Int. Cl.$^4$ ............................................. A01D 45/02
[52] U.S. Cl. ............................................. 56/228; 56/98
[58] Field of Search ............................. 56/98, 119, 228

[56] References Cited

U.S. PATENT DOCUMENTS

| | | | |
|---|---|---|---|
| 2,224,970 | 12/1940 | Lindgren et al. | 56/228 |
| 4,009,557 | 3/1977 | Reicks | 56/98 |
| 4,084,396 | 4/1978 | Fritz et al. | 56/98 |
| 4,086,749 | 5/1978 | Greiner et al. | 56/98 |
| 4,227,366 | 10/1980 | Puchar | 56/98 |
| 4,244,162 | 1/1981 | Puchar | 56/14.2 |
| 4,333,364 | 6/1982 | Greiner et al. | 56/98 |
| 4,409,780 | 10/1983 | Brougher et al. | 56/228 |
| 4,418,517 | 12/1983 | Ehrhart et al. | 56/228 |
| 4,441,305 | 4/1984 | Lippl | 56/228 |

FOREIGN PATENT DOCUMENTS 2026190 12/1970 Fed. Rep. of Germany.

Primary Examiner—Paul J. Hirsch
Attorney, Agent, or Firm—Michael J. Striker

[57] ABSTRACT

A front attachment of a field chopping machine for picking and transporting stalk fruits standing in a row has a plurality of stalk dividers, at least four transporting passages inclined relative to one another opposite to a travelling direction, and a transporting element provided in each of the transporting passages, wherein two outwardly located transporting passages with their transporting elements are turnable upwardly to an inoperative position each one about an axis extending in the travelling direction and are fixable in this position. The outer transporting passages are turnable about the axle provided on a supporting frame of the attachment.

8 Claims, 2 Drawing Sheets

FRONT ATTACHMENT OF FIELD CHOPPING MACHINE FOR PICKING AND TRANSPORTING STALK FRUITS STANDING IN ROWS

This is a continuation of application Ser. No. 865,747, filed May 20, 1986, now U.S. Pat. No. 4,739,608, which is in turn a continuation application of Ser. No. 530,074, filed Sep. 7, 1983, now U.S. Pat. No. 4,633,657.

BACKGROUND OF THE INVENTION

The present invention relates to a front attachment of a field chopping machine for picking and transporting stalk fruits standing in a row.

The DE-GM No. 7,118,507 discloses a front attachment of a field chopping machine, particularly a multi-row corn picking attachment, for a harvester in which outer hoods serving as outer stalk dividers are arranged pivotally on a supporting chassis of the picking attachment and are turnable inwardly to the central hoods. As a result of this, the width of the attachment can be reduced for street transportation to a value which does not exceed the legally required maximum width of 3 meters. The disadvantage of this proposal is, however, that the reduction of the entire width of the harvesting attachment can be provided by at most 50 cm, inasmuch as the supporting frame for the outer hoods which is provided with endless rotatably driven transporting elements is rigidly connected with the remaining supporting chassis of the attachment. With an operational width of the harvesting attachment over 3.5 m, or in other words in a harvesting attachment provided with more than four transporting passages, a reduction of the transporting width to the legally prescribed maximum value is no longer possible. For this case, the entire front attachment must be moved for the street transport by a special trailer in a known manner.

SUMMARY OF THE INVENTION

Accordingly, it is an object of the present invention to provide a front attachment for a field chopping machine for picking and transporting stalk fruits standing in a row, which avoids the disadvantages of the prior art.

More particularly, it is an object of the present invention to provide a front attachment of a field chopping machine for picking and transporting stalk fruits standing in a row, which has a simple construction, and with a great working width, for example with more than four transporting passages, can be adjusted easily and fast to the size required for the street transportation in accordance with the prescribed legal regulations.

In keeping with these objects and with others which will become apparent hereinafter, one feature of the present invention resides, briefly stated, in a front attachment for a field chopping machine for picking and transporting stalk fruits standing in a row, which has at least four transporting passages limited by stalk dividers, inclined in a direction opposite to the travelling direction and each provided with an endless transporting element, wherein the outer transporting passages with their transporting elements are turnable upwardly each one about an axis extending in the travelling direction to an inoperative position and are fixable in this position. More particularly, the outer transporting passages are turnable about an axle provided on a supporting chassis of the front attachment.

When the front attachment of a field chopping machine is designed in accordance with the present invention, the above mentioned highly advantageous results are provided.

The novel features which are considered characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

DESCRIPTION OF A PREFERRED EMBODIMENT

Figure 1:
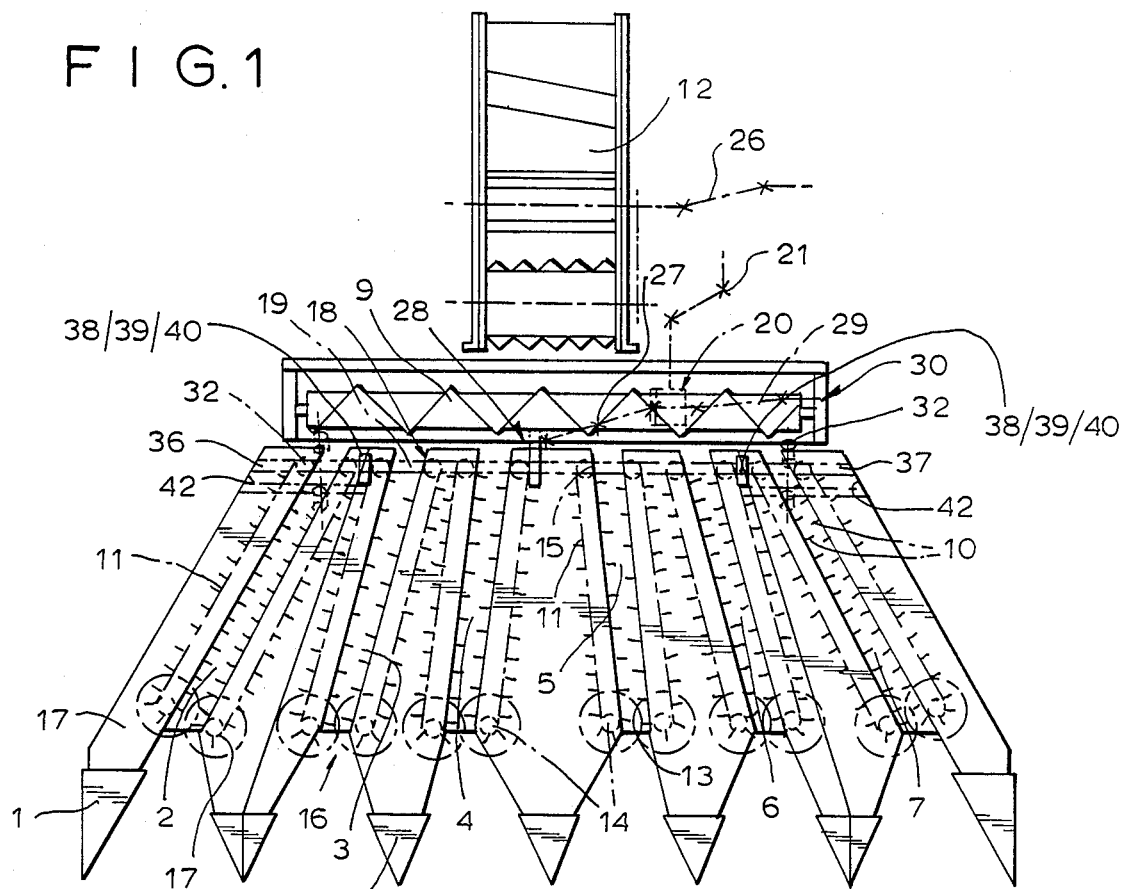
FIG. 1 is a plan view of a corn harvesting front attachment in accordance with the present invention.
Figure 2:
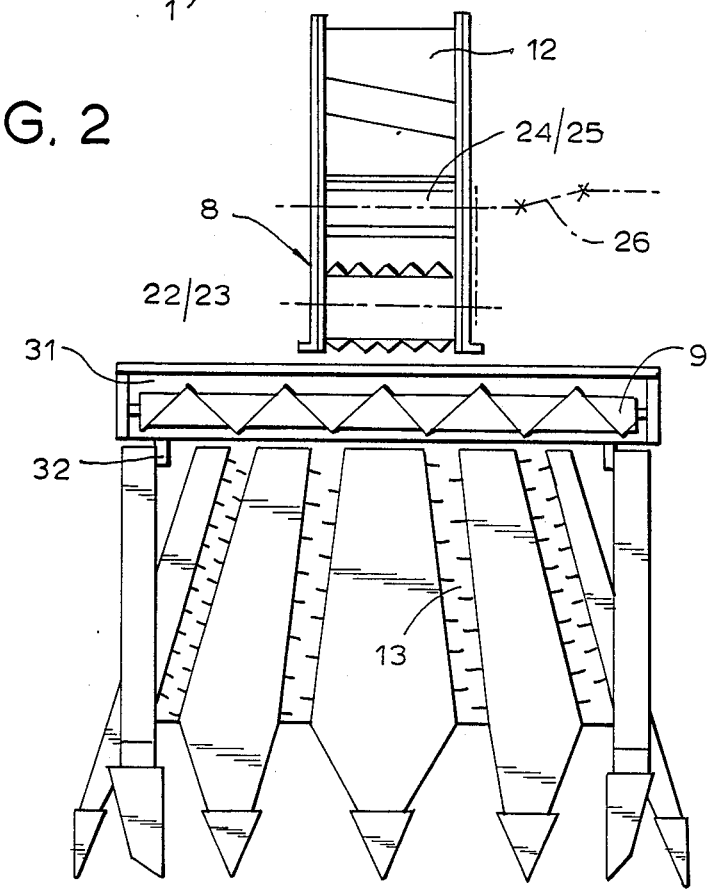
FIG. 2 is the corn harvesting front attachment of FIG. 1 with upwardly turned outer transporting passages.

FIG. 1 shows a front attachment on a field chopping machine for picking and transporting of stalk fruits standing in rows, such as corn. The front attachment has six transporting passages 2, 3, 4, 5, 6, 7 which are limited by stalk dividers 1. The transporting passages 2-7 end directly before a transverse transporting screw 9 arranged before a drawing passage 8 of a chopping machine 12.

Transporting elements 11 extend through the transporting passages 2-7. The transporting elements 11 are formed as roller chains and rotate around two deviating rollers 14 and 15. The transporting passages 2-7 extend inclined relative to one another in a direction which is opposite to the travelling direction and in correspondence to the width of the transverse transporting screw 9, which is under 3 m. From below, the transporting passages 2-7 are limited by transporting bottoms 13. A cutting device for separating the standing stalk fruits from their roots is associated with each transporting passage 2-7 in the product picking region. The cutting device includes a pair of cutting disks 17 which are driven for rotation in opposite directions and cooperate with one another. The cutting disks 17 are fixedly connected with the shafts of the respective deviating rollers 14 for joint rotation therewith and are driven in rotation via the same.

The transporting elements are driven from a main drive shaft or a transverse shaft 19 which is located under the transporting bottom 13 of the transporting passages 2-7 and connected with the shafts of the rear deviating roller 15 of the transporting elements 11. The main drive shaft 19 is driven from a not shown central drive of the machine via a spur gear transmission 28, a universal joint shaft 27, a bevel main transmission 20 supported on the front attachment, and a universal joint shaft 21. Transporting elements 22, 23, 24, 25 in the drawing passage 8 are also driven from the central drive of the machine via for example universal joint shaft 26. Finally, a cutter of the chopper 12, which cooperates with a stationary countercutter, is also driven from the central drive of the machine. The transverse transporting screw 9 is driven from the main bevel transmission 20 via a universal joint shaft 29 and a chain drive 30. The chopper 12 can be associated in a known manner with the chassis of a pulled or self-propelled machine.

The outer transporting passages 2 and 7 are turnable upwardly and fixable transversely to the travelling direction to an inoperative position, about an axle 32 provided on a supporting frame 31 of the front attachment. For this purpose the main drive shaft 19 can, during turning of the transporting passages 2 and 7, be brought into or out of drive connection with drive shafts 36, 37 of the outer transporting passages 2, 7, the drive shafts 36, 37 lying at an extension of the main drive shaft 19. This bringing takes place via coupling devices 38, 39, 40 arranged at both ends of the shaft 19. The coupling devices 38, 39, 40 are formed as a claw coupling in which the coupling half 38 is fixedly connected with the free end of the main drive shaft 19, whereas another coupling half 39 is axially movable against the force of the spring 40 on the inner end of the drive shaft 36, 37 of the associated turnable transporting passages 2, 7, as can be seen from FIG. 3.

For locking the turnable transporting passages 2, 7 in the operational position, arresting pins 42 are provided on the frames of the transporting passages 2, 7 parallel to the drive shafts 36, 37 and axially movable against a spring force of the spring 41. The arresting pin 42 engages in an opening 43 of the supporting frame 31 of the front attachment.

Figure 3:
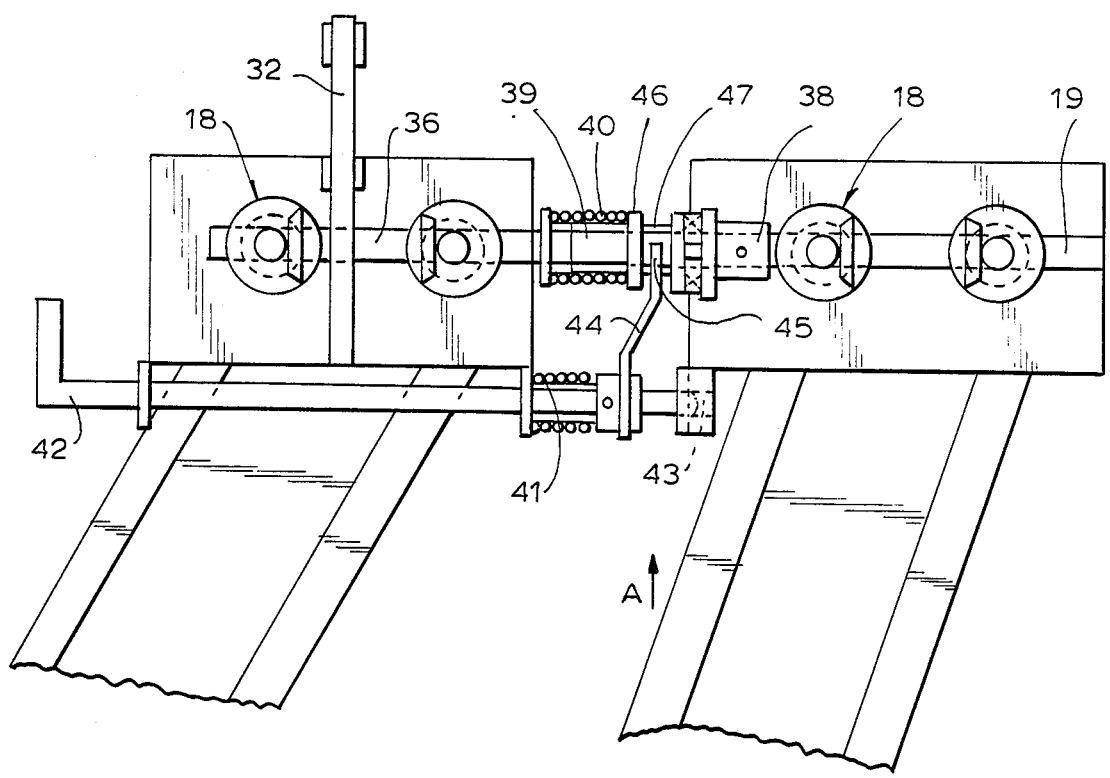
FIG. 3 is a view showing a turning and coupling device for one of the outer turnable transporting passages on an enlarged scale.

Each of the arresting pins 42 has a drive lever 44 which engages with its fork-shaped free end 45 an annular groove 47 provided in a collar 46 of the axially movable coupling half 39. During unlocking of the transporting passages 2, 7, the drive lever 44 under the action of the axial movement of the arresting pin 42 against the force of the spring 41, axially displaces the coupling half 39 against the force of the spring 40, as can be seen in FIG. 3. By the forced axial displacement of one coupling half 39 during unlocking of the transporting passages 2, 7 a blocking between both coupling halves 38, 39 during the beginning of the upward turning of the transporting passages 2, 7 is excluded. The same is true for the reversed process when the transporting passages 2, 7 are again to the operative position. Moreover, because of the axial movability of one coupling half 39 against the spring force of the spring 40, it is guaranteed that in each turning position of both coupling halves 38, 39 relative to one another, an automatic driving connection between the main drive shaft 19 and the drive shaft 36, 37 of the outer transporting passages 2, 7 takes place.

Figure 4:
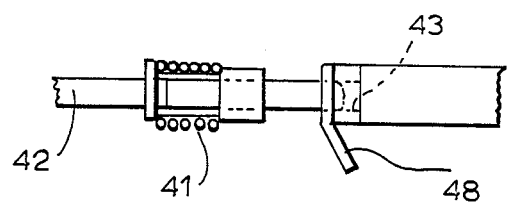
FIG. 4 is a view in direction of the arrow A in FIG. 3.

For an automatic locking of the outer transporting passages 2, 7 in the operational position, a running-up surface 48 which leads to the arresting opening 43 is provided in the path of turning of the free end of the arresting pin 42. The running-up surface 48 displaces during turning of the outer transporting passages 2, 7 the arresting pin 42 axially against the force of the spring 41. Then, after ending of the turning step the spring 41 moves the arresting pin 42 automatically with its inner end into the opening 43 as can be seen from FIG. 4.

It will be understood that each of the elements described above, or two or more together, may also find a useful application in other types of constructions differing from the types described above.

While the invention has been illustrated and described as embodied in a front attachment for a field cutting machine for picking and transporting of stalk fruits standing in rows, particularly corn, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A front attachment of a field chopping machine for picking and transporting stalk fruits standing in rows, particularly corn, comprising a drawing channel; a transverse transporting element located forwardly of said drawing channel as considered in a travelling direction and extending in a direction which is transverse to the travelling direction, said transverse transporting element having in said transverse direction a predetermined width which does not exceed a permissible street transportation width; a supporting frame supporting said transverse transporting element and provided with an axle extending substantially in said travelling direction; a plurality of transporting passages extending immediately from said transverse transporting element and each having an endless transporting element, said transporting passages including central passages which are immovably supported on said supporting frame and two outer passages; a plurality of stalk dividers laterally limiting said transporting passages and each having a front tip as considered in the travelling direction, said stalk dividers including two outer stalk dividers, said outer stalk dividers together with said two outer transporting passages being turnable about said axle downwardly to an operative position and fixable in the latter so that in said operative position said tips of said outer stalk dividers are spaced from one another by a distance which is considerably greater than the width of said transverse transporting element, said outer stalk dividers being turnable about said axle upwardly to an inoperative position of said supporting frame without turning any part of said supporting frame and said transverse transporting element and also fixable in said inoperative position so that in said inoperative position the distance between said tips of said outer stalk dividers does not exceed the width of said transverse transporting element and therefore a width of the front attachment is determined by the width of said transverse transporting element.

2. A front attachment of a field chopping machine as defined in claim 1, wherein each of said outer transporting passages has a drive shaft; and further comprising a drive for said transporting elements of said transporting passages and including a main drive shaft located under said transporting passages and arranged so that said drive shafts of said outer transporting passages lie on the extension of said main drive shaft and are automatically bringable into and out of driving connection with the latter during turning of said outer transporting passages.

3. A front attachment of a field chopping machine as defined in claim 2, wherein said main drive shaft has two ends; and further comprising a coupling device provided at each end of said main drive shaft and operative for bringing said drive shafts of said outer transporting passages into and out of driving connection with said main drive shaft.

4. A front attachment of a field chopping machine as defined in claim 3, wherein each of said outer transporting passages has an inner end, each of said coupling devices being formed as a claw coupling and having one coupling half which is supported axially movable against a spring force on the inner end of the drive shaft of a respective one of said outer transporting passages.

5. A front attachment of a field chopping machine as defined in claim 1, wherein each of said outer transporting passages has an inner end, each of said coupling devices being formed as a claw coupling and having one coupling half which is supported axially movable against a spring force on the inner end of the drive shaft of a respective one of said outer transporting passages.

6. A front attachment of a field cutting machine as defined in claim 1, wherein each of said outer transporting passages has a frame and a drive shaft; and further comprising means for locking each of said outer transporting passages in an operative position, said locking means including an opening provided in said supporting frame, and an arresting pin axially movable on said frame of a respective one of said transporting passages parallel to the respective drive shaft against a spring force and engageable in said opening of said supporting frame.

7. A front attachment of a field cutting machine as defined in claim 6, wherein each of said arresting pins has an inner end, said locking means including a running-up surface associated with said opening and arranged so that said inner ends of a respective one of said arresting pins cooperates with said running-up surface so as to provide an automatic locking of each of said outer transporting passages in the operative position.

8. A front attachment of a field chopping machine for picking and transporting stalk fruits standing in rows, particularly corn, comprising a drawing channel; a transverse transporting element located forwardly of said drawing channel as considered in a travelling direction and extending in a direction which is transverse to the travelling direction, said transverse transporting element having in said transverse direction a predetermined width which does not exceed a permissible street transportation width; a supporting frame integral with and supporting said transverse transporting element, said supporting frame being provided with an axle extending substantially in said travelling direction; a plurality of transporting passages extending immediately from said transverse transporting element and each having an endless transporting element, said transporting passages including central passages which are immovably supported on said supporting frame and two outer passages; a plurality of stalk dividers laterally limiting said transporting passages and each having a front tip as considered in the travelling direction, said stalk dividers including two outer stalk dividers, said outer stalk dividers together with said two outer transporting passages being turnable about said axle downwardly to an operative position and fixable in the latter so that in said operative position said tips of said outer stalk dividers are spaced from one another by a distance which is considerably greater than the width of said transverse transporting element, said outer stalk dividers being turnable about said axle upwardly to an inoperative position of said supporting frame without turning any part of said supporting frame and said transverse transporting element and also fixable in said inoperative position so that in said inoperative position the distance between said tips of said outer stalk dividers does not exceed the width of said transverse transporting element and therefore a width of the front attachment is determined by the width of said transverse transporting element.

* * * * *